May 9, 1967 P. W. JOHNSON 3,318,011
DIMENSIONAL GAGE WITH TANDEM PEDESTALS
Filed Dec. 24, 1964 3 Sheets-Sheet 1
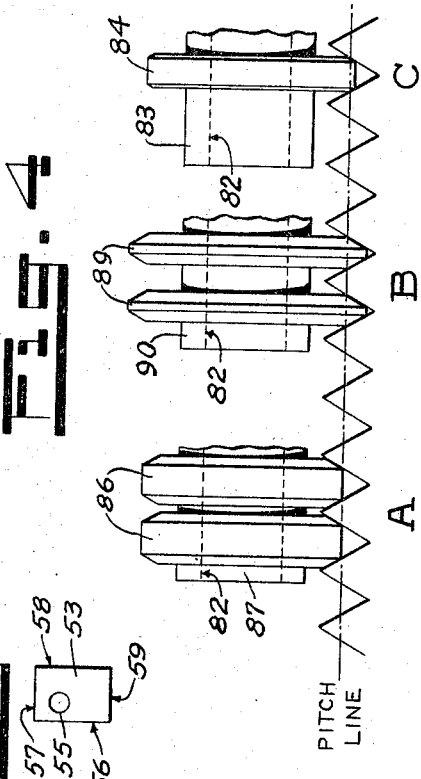
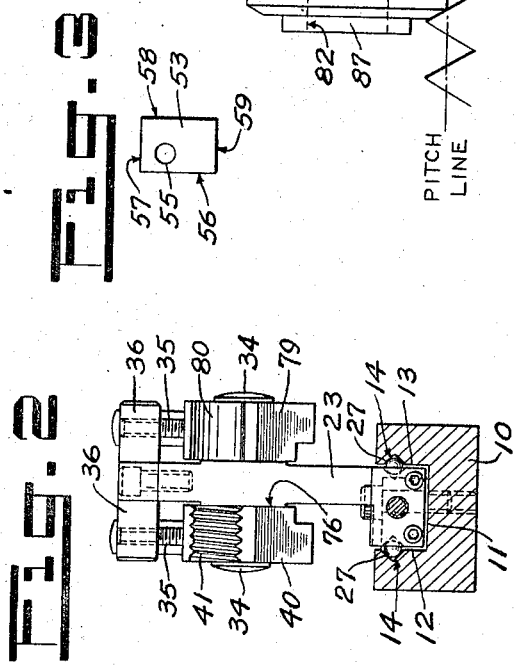
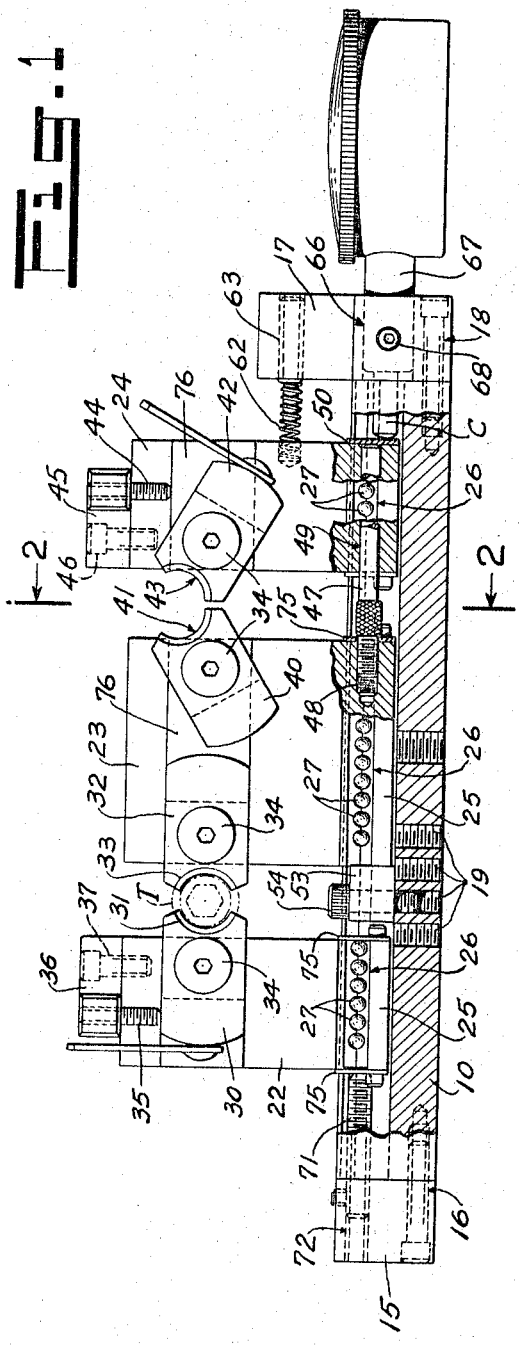
INVENTOR.
PAUL W. JOHNSON
BY
John M. Montstream
ATTORNEY

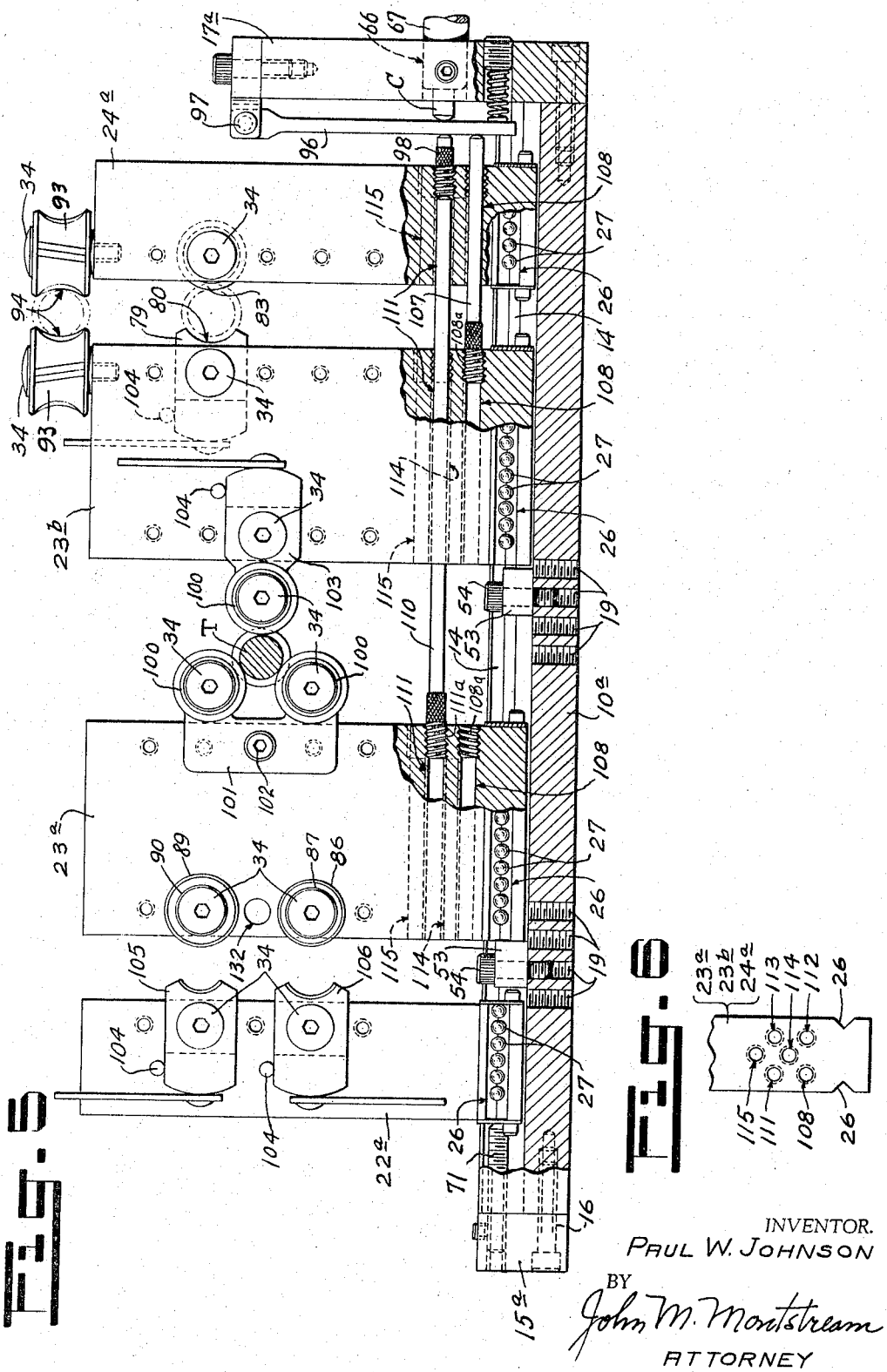

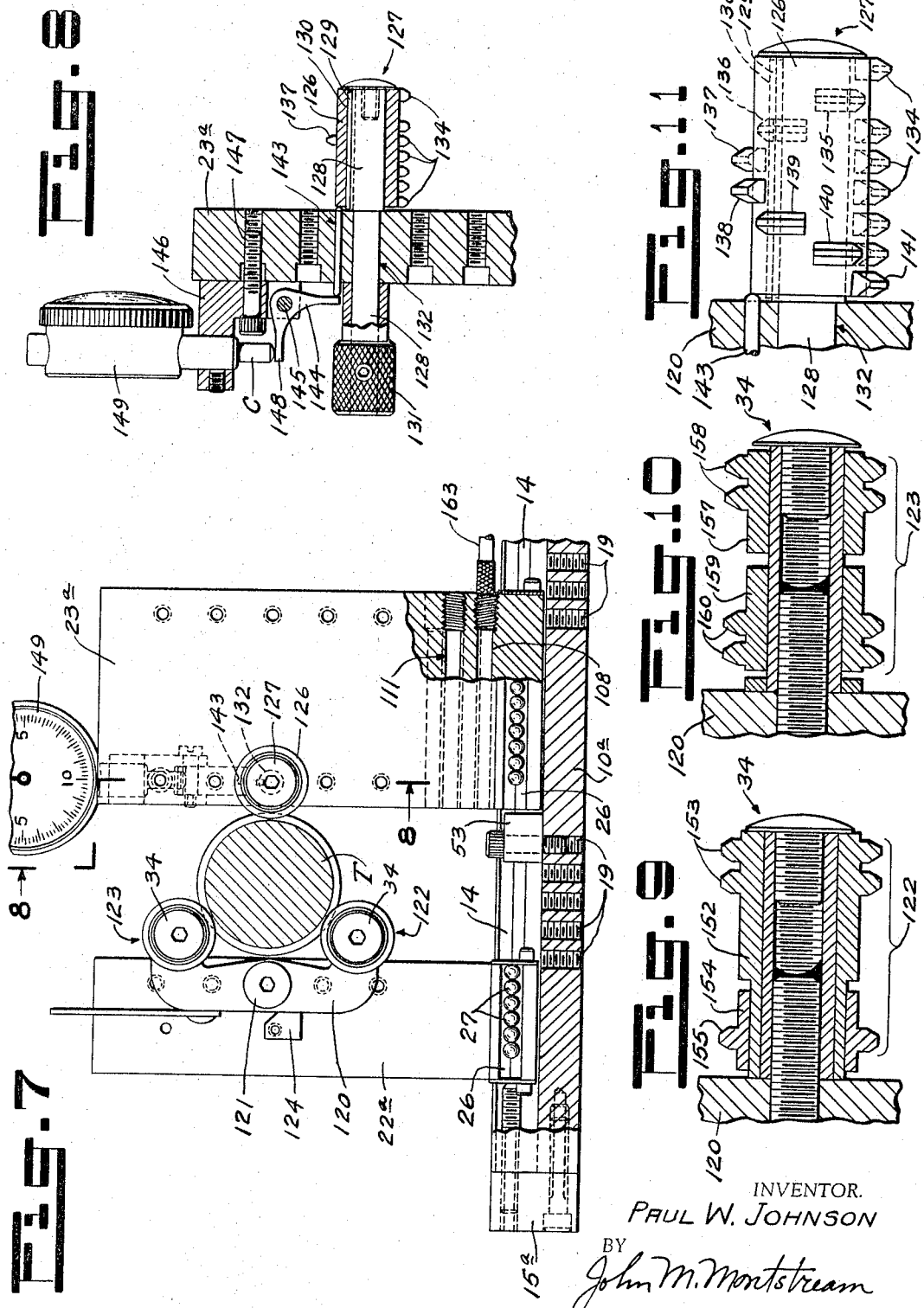

United States Patent Office 3,318,011
Patented May 9, 1967

3,318,011
DIMENSIONAL GAGE WITH TANDEM PEDESTALS
Paul W. Johnson, Bloomfield, Conn., assignor to The Johnson Gage Company, Bloomfield, Conn., a corporation of Connecticut
Filed Dec. 24, 1964, Ser. No. 421,037
15 Claims. (Cl. 33—199)

The invention relates to a dimensional gage having a plurality of pedestals in tandem relation with a gaging element or elements on each pair of adjacent pedestals. At least one gaging unit is provided, each unit comprising two or more gaging means. One gaging means includes one gaging element carried by one pedestal and a cooperating gaging element or elements carried by an adjacent pedestal. A second gaging means has one gaging element carried by the one of the above pedestals and its cooperating gaging element is carried by another adjacent pedestal. The gage may be used for gaging plain surfaces although it has particular applicability as a screw thread gage in which each gaging unit will gage for a different characteristic of a test screw thread.

An object of the invention is to construct a dimensional gage which will test a test part for the accuracy of two or more dimensions or other characteristics about which information as to accuracy is desired and which can be manufactured economically and yet give accurate test results.

Another object of the invention is as above with the gaging elements having surfaces for a screw thread which test for at least two thread characteristics.

Another object is as above and in addition provides a gage which can be used for a wide range of diameters of test parts or screw threads by substituting gaging elements primarily and adjusting the position of at least one of the pedestals.

A still further object is to construct a single gage with multiple pedestals in tandem which will test for triangular engagement and diametrical engagement of a test part with a single indicator.

Other objects of the invention will be more apparent from the following description when taken in connection with the accompanying drawings illustrating preferred embodiments thereof in which:

FIG. 1 is a side view of the gage with portions thereof in section:

FIG. 2 is a cross-section through the gage taken on line 2—2 of FIG. 1;

FIG. 3 is a view of a pedestal stop providing a plurality of stop positions for the second pedestal;

FIG. 4 is a partial view of forms of gaging elements showing some of the various forms of elements A, B and C;

FIG. 5 is a partial view of a four pedestal gage;

FIG. 6 is a partial view of one end of a pedestal;

FIG. 7 is a tri-roll gaging unit primarily for lead testing;

FIG. 8 is section taken on line 8—8 of FIG. 7; and

FIGS. 9 and 10 are sections and FIG. 11 is a side view of the gaging rolls for FIG. 7.

The dimensional gage includes a base 10 having side walls. In the illustrated embodiment a groove 11 is provided in the base so that the base has side walls 12 and 13 facing towards each other. Each side wall has a guide or guideway of suitable form that shown being a ball race 14 extending the full length of each side wall so that one guideway on each side wall serves to mount all three pedestals, and the guideway may be machined and ground straight through. The base may include an end member 15 at one end thereof shown as secured thereto by screws 16 and another end member 17 secured at the other end of the base by screws 18. The base is shown with a plurality of longitudinally spaced threaded holes 19 in the bottom of the groove.

Pedestal means are mounted on the base and as shown includes a first pedestal 22, a second pedestal 23 and a third pedestal 24. Each pedestal is mounted on the guideway in the groove in tandem relation and such that at least the second and third pedestal are moveable on the base and preferably the first pedestal is adjustable thereon. Each pedestal, therefor, has opposite side walls 25 in each of which there is a guideway, preferably a ball race 26 in the form of a V groove. Balls 27 are provided in the cooperating ball races to moveably mount the second and third pedestals on the base. Preferably the first pedestal is adjustable on the base so that it too is provided with ball races in the side walls. In order to secure free rolling and rigidity in the ball bearing pedestal mounting, the balls are selected slightly larger, such as .00005 to .002 of an inch, than the spaces between the cooperating ball races so that the balls must be pressed into the ball space between races and are under some compression. So constructed the pedestals are freely moveable on the base or guideway and yet provides sufficient rigidity so that there will not be shake of any pedestal on the base.

It is clear that one of the parts including the base and the pedestal means has a groove or grooves to provide two side faces directed towards each other in each of which there is a guideway or ball race and the other part has two side faces facing away from each other and carrying guideways or ball races which provide a guide means or mounting means for the pedestal means on the base.

Gaging means is provided on the first and second pedestals. The pedestal 22 carries a gaging element 30 shown as a segment with arcuate gaging surface 31. A cooperating gaging element 32 is carried by the pedestal 23, shown as a gaging segment with an arcuate gaging surface 33. With gaging segments each gaging element is pivotally mounted on its pedestal by suitable stud means 34 which may be eccentric, if desired, for further adjustment. A suitable gaging element stop, shown as a screw 35, is carried by the pedestal 22. This stop may be carried by a stop block 36 secured to the top of the pedestal by a screw 37.

A second gaging means is mounted on the second pedestal 23 and the third pedestal 24 which means includes a gaging element 40, shown as a segment having an arcuate gaging surface 41, and a cooperating gaging element 42, shown as a segment having an arcuate gaging surface 43 carried by the third pedestal. The cooperating gaging elements 40 and 42 are pivotally mounted on its respective pedestal on suitable pivotal means or studs 34. These studs may be eccentric for adjustment if so desired. With gaging segments both segments are pivotally mounted on the studs for insertion and removal of the test part T or thread therein. One of the segments or the pivotal segment 42 has its pivotal movement halted in gaging position by a stop, shown as a screw 44 carried by a stop block 45 secured to the top of the pedestal 24 by a screw 46.

A unidirectional connection or connecting means is provided between the second and the third pedestals such that the second pedestal moves the third pedestal and the third pedestal may move independently of the second pedestal. This operating connection may take several forms that shown being a pin 47 which is secured to one pedestal and engages the other. The connection may be a threaded pin received in a threaded hole 48 carried by the second pedestal and the end of the pin engaging the third pedestal. The construction particularly illustrated using a pin 47, provides a hole 49 in the third pedestal in which the pin slides with the end of the pin engaging a ball retainer plate 50 carried by the third pedestal.

Means are provided to limit the movement of the pedestal 23 towards the first pedestal, yet allow freedom of movement in the other direction. This means may include a pedestal stop 53 which is secured to the base 10 by a screw 54, the screw being received in a threaded hole 19 in the base. This pedestal stop 53 is constructed to provide different distances from the screw hole 55 by having each face thereof a different distance from the hole so that the second pedestal may engage a selected face. In other words face 56 has a minimum spacing from the hole 55, face 57 is located a little farther away, face 58 is located a little farther away than face 57 and face 59 is a little farther away from the hole 55 than face 58.

Means are provided to propel the third pedestal towards the second pedestal and both third and second pedestals towards the pedestal stop 53 and the first pedestal. This means is a spring 62 shown as mounted on a threaded pin 63 and engaging the third pedestal 24. Threaded pin 63 may be carried by the head 17 and permits adjustment of the compression in the spring 62.

One of the parts including the base and the third pedestal carries indicator mounting means for an indicator located so that it engages the other part to be responsive to the movement of the third pedestal. The mounting means particularly shown includes a hole 66 carried by the base, or particularly by the end member 17, in which hole the stem 67 of an indicator is received. The indicator mounting means is located so that the contactor C of the indicator engages the pedestal 24 or particularly the ball retaining plate 50 thereof. The movement of the third pedestal to the right away from the second or first pedestal will move the contactor C and the position of the pedestal will be indicated on the dial of the indicator. The position of the third pedestal is the equivalent of the gaging position of the gaging element 32 or 42.

The gage described, without more, will gage a test part T for two essential characteristics of or diameters of the test part and for a test screw thread will gage the thread such as its pitch diameter and overall assemble-ability of the thread with its mating hole. It is immaterial which gaging means is for pitch diameter with one, two or at most three thread gaging ridges on the gaging surface and which gaging means provides a test for overall assemble-ability with a plurality of thread ridges forming the thread gaging surface. The gage as described, however, provides a gage which is economical to manufacture since one guide means mounts at least two and preferably all three pedestals and the gage is effective as to its accuracy.

The gage is used in a manner now to be described. The first pedestal 22 to all intents and purposes is fixed so far as gaging is concerned, whereupon the insertion of a test piece T within the gaging means 30, 32 will move the second pedestal 23 away from the first pedestal 22 and the pedestal stop 53. This movement of the pedestal 23 is transmitted through the connecting means 47 to the third pedestal 24 which in turn moves the contactor C of the indicator. If the thread is a perfect thread the indicator pointer will read zero. Any deviation of the test part or thread from a perfect part or thread will be shown by the pointer as a plus or minus from zero and an excessive plus or minus will carry the pointer beyond tolerance limits usually carried by the indicator. The test part or thread is then removed from the gaging means formed by the gaging elements 30 and 32 and inserted within the gaging means provided by gaging elements 40 and 42. The second pedestal now abutts the pedestal stop 53 and the third pedestal 24 moves away from the second pedestal, or to the right as viewed in FIG. 1, and the position of the third pedestal and its gaging element is shown by the pointer of the indicator in the same manner as described for gaging elements 30 and 32.

The gage described is suitable for construction for a wide range of different sizes of test parts or threads, such as ¼ inch to above an inch primarily by substituting gaging elements of proper size or screw thread size, and adjusting the positions of the first and second pedestals. It is for this reason that the first pedestal is mounted for adjustment in the guide means of the base. The position of the first pedestal 22 may be adjusted by means of a first pedestal adjusting means which may be of any suitable construction that shown being an adjusting screw 71 which is threaded into a hole 72 carried by the base or particularly the end member 15. The end of this screw engages the pedestal 23 and limits its movement to the left. To all intents and purposes this fixes the first pedestal in position for gaging purposes, since the first pedestal will not move to the right in the gaging operation and hence may be actually fixed against movement after proper adjustment. The screw 71 provides a simple construction for retaining the first pedestal in adjusted position on the base.

The stop position of the second pedestal 23 towards the first pedestal may be adjusted in two ways, namely by positioning one of the faces 56, 57, 58 or 59 of the stop 53 for abutting engagement with the pedestal 23 and in addition this second pedestal stop may be moved lengthwise of the base by selecting any one of the other three positions provided by the four threaded holes 19. This provides 16 different stop positions. It is essential that movement of the second pedestal to the left or towards the first pedestal be limited by the stop but with freedom of movement in the direction of the third pedestal when gaging between elements 30, 32. The connection means or pin 47 between the second and third pedestals is adjustable such as through the thread 48 or may be substituted by another connecting pin of the proper length or both methods may be used for adjustment. The gage functions in the same manner as described for any size of test part or thread being gaged.

Ball retaining plates 75 may be provided where needed on the ends of each pedestal. The pedestals may have gaging element pads or bosses 76 to be surface ground for the studs and the gaging elements.

A second gaging unit as illustrated generally in FIG. 2, may be provided on the opposite side of one or more pairs of pedestals for gaging other portions of a test part or gaging other characteristics of a screw thread of the same size. For example, the gaging element 79 is a segment pivotally mounted on pedestal 23 and having a plain arcuate gaging surface 80. Its cooperating gaging element on pedestal 24 may be a like segment so that the gaging means formed thereby will test the outside diameter of a plain surfaced portion of a test part or with gaging surfaces corresponding in diameter with the outside diameter of the same thread, will test for this dimension of the thread. The gaging means of the second unit may be for a thread of a different size in the event that the test piece has two threads of different diameters or different pitches. In other words, one pair of gaging segments for one gaging means would be like gaging elements 40 with a full thread for testing for assemble-ability and the gaging means of the other pair would have a single or double thread ridge for gaging pitch diameter and both pairs being for a different thread diameter.

Also the gaging elements need not be gaging segments as particularly illustrated but may be gaging means of known form using gaging rolls (Patent 2,696,675). In this form one gaging means comprises two rolls in angularly spaced relation carried on a pivoted roll carrier which is mounted on one stud and a cooperating single gaging roll is rotatably mounted on the stud of the adjacent pedestal.

FIG. 4 illustrates an enlarged thread profile with gaging rolls for determining other thread characteristics. The rolls having holes or bearings 82 to receive a stud 34 on which the roll rotates. For example, FIG. 4C illustrates a portion of a gaging roll 83 having a pitch diameter thread ridge 84 around its periphery. Its ridge is shaped to engage at the pitch diameter (pitch line) of the thread and is of the cone type to engage opposite flanks of one thread groove. A known equivalent roll is the V type having a ridge to engage opposite flanks of one thread spiral of the test thread. The pitch diameter roll carried by pedestal 24 cooperating with the segment 79 having a plain gaging surface 80 on the adjacent pedestal will test the thread as to centricity between the outside diameter and the thread of the test hread. This is determined by rotating the test part in test position. When rotated and the pointer on the indicator does not move, this shows that the two are concentric. If the pointer moves, eccentricity is shown and the amount of eccentricity between the two. It is clear, therefore, that a gaging means may comprise a segment as one element and a roll as its cooperating element.

There is a further example illustrated in FIGS. 4A and 4B, in which FIG 4A shows thread ridges 86 on a gaging roll or element 87 for engaging the portion of a thread outwardly of the pitch diameter, and FIG. 4B shows gaging ridges 89 of a gaging element or roll 90 formed to engage the portion of the thread inwardly of the pitch diameter. The gage provided with a pair of gaging rolls or elements having thread ridges of form 4A as one gaging means and a second pair of gaging rolls or elements as a second gaging means having thread ridges of form 4B mounted on adjacent pedestals, then with the test part inserted in both gaging means the readings are noted. A comparison of the readings from each gaging means will give a measure as to the accuracy of the V or angle of the test thread. Also the gaging elements of 4B will give some indication as to the accuracy of the minor diameter of the thread. If a more precise test of the accuracy of the minor diameter of the test thread should be the desired, the thread ridge or ridges would be narrower than the thread ridges 89 to reach down to the root of the thread. The form of the thread ridge or its cross-section may be the cross-section of the thread ridges in the gaging surface of a segment to give the same test information. The examples discussed show that the gage has a wide range of test capabilities and there are others.

The tandem gage illustrated, shows a plurality of pedestals and particularly three pedestals. The gage with a gaging unit on one side of the pedestals and a second gaging unit on the other side would require right hand and left hand manipulation. The operator may prefer all right hand manipulation. It is pointed out therefore, that any number of pedestals may be mounted in line, duplicating the center pedestal in every respect including the stop of FIG. 3. The base, of course, must be long enough to accommodate the number of pedestals used. Such a gage would function identically as described in connection with the gage having three pedestals particularly illustrated. The gage therefore, is provided with a first pedestal and a last pedestal and with at least one intermediate pedestal. Each intermediate pedestal will be provided with a connection 47 to its next adjacent pedestal to transmit its gaging motion thereto and hence ultimately to the last pedestal and the indicator. The pedestals of a gage having more than one intermediate pedestal may, of course, have a gaging unit of gaging means on opposite sides thereof or one side only.

The gage of FIG. 5 further illustrates the wide adaptability of this form of gage. The base 10a and the pedestals are of the same construction as that of FIG. 1 except that the base is longer, the pedestals 23a, 23b and end member 17a are taller and hence are not further described. They are assigned the same numerals as those applied in FIG. 1 with letter subscripts and like parts bear the same numerals. The segmental gaging elements 40 and 42 have not been shown in this figure in order to more clearly show the combination of the gaging segment 79 in gaging position and the gaging roll 83.

The pedestals 23b and 24a, show a gaging means comprising two wheel type gaging elements 93, one being rotatably mounted on the top of each of the two pedestals. These gaging elements are in effect rolls with a concave gaging surface 94 around the periphery of the wheel or roll and thread ridges extending crosswise at the helix angle within the arcuate gaging surface. Because of ridge and thread interference the ridges are not long and in fact are short and a true ridge at the center only. Each gaging wheel is mounted on a stud 34 threaded into the top surface of its respective pedestal so that the wheels rotate on a vertical axis. The wheel gage is used for testing quickly and easily a long screw threaded part throughout its length. The screw thread is pushed horizontally between the wheels and the indicator is watched for any changes in reading for any thread faults which may occur. For example, a tapered thread would be indicated by the indicator starting at a low (or high) reading and with a gradually increasing (or decreasing) reading at the other end of the thread. The indicator may start with a low reading which goes to a high reading about at the mid point of the length of the screw thread and then decreases again, showing a compound taper in the thread. By turning the test screw thread 90 degrees and running it again through the wheel gage, or turning it and pulling the thread in a return direction a lower reading than that of the first run-through indicates an oval condition. For a long screw thread, the wheel gage tests considerably faster than by multiple insertions and removals of the test part throughout its length in a segmental or roll type of gaging means.

The gage in FIG. 5 shows a hinged connecting lever 96 as part of the connecting means between the pedestals and the contactor C of the indicator. This lever has a width at least approximating the width of the pedestals for reasons which will be discussed hereinafter. This lever is hinged to the base in any suitable manner and position such as by means of a hinge 97 carried on the top of the end member 17a and the lever hanging down between the end member and the last pedestal 24a such that it engages the contactor of the indicator that is this connecting lever hangs adjacent to the indicator mounting means or hole 66 such that an indicator will be operated. A connecting rod or pin carried by the pedestal 24a engages the lever at the same distance from the hinge as the point of contact of the contactor C of the indicator so that there is a 1 to 1 ratio in the indication of the movement or position of pedestal 24a with respect to the indicator.

It is desirable at times to have a gage comprising three gaging rolls or elements engaging a test piece at three spaced points around the periphery of the test part. One form of such gaging means is illustrated carried by the adjacent intermediate pedestals 23a and 23b. Pedestal 23a carries a gaging element comprising a pair of spaced gaging rolls 100 each rotatably mounted on a stud 34 mounted on a carrier 101 which is secured to pedestal 23a by a screw 102. Pedestal 23b carries a gaging element shown as a single roll 100 mounted on a stud 34 which stud is carried by a roll lever 103. The roll lever is pivotally mounted on pedestal 23b by a stud 34 spaced from the gaging roll. A stop 104 is carried by the pedestal to limit the pivotable movement of the gaging element to gaging position opposite a mid position between the two gaging rolls carried by pedestal 23a. The roll lever 103 and its roll 100 is pivoted upwardly to open this gaging means for insertion of the test part T after which the roll lever and its roll is pivoted downwardly into gaging position as shown. The pedestal 23a abuts its stop 53 and pedestal 23b assumes a position determined by the test part which position or movement is transmitted to the indicator.

The gaging means illustrated in FIG. 1 engage the test part across its diameter and, therefor, a 1 to 1 motion transmitting ratio of the connecting means is provided between the pedestal and the indicator. The triangular arrangement of the three gaging rolls 100 engages a test piece preferably at equal 120 degree positions around the periphery of the test part with the result that the indication is not that of a diameter but is .866 of the diameter. Since the setting of the indicator is with a master or perfect test part, therefore, any test thread which records zero on the indicator would be an accurate reading but not any reading which deviates therefrom. It is for this reason that for accuracy on the plus or minus side of a perfect thread, the connecting means desirably, should have an .866 connecting ratio of motion transmission. This is achieved by means of the connecting rod or pin 107 which is carried by the pedestal 23b, passes through a hole 108 in pedestal 24a and engages the connecting lever 96 such that the contactor C of the indicator engages the lever at a point which is .866 of the distance between the point of contact of the connecting rod 107 with the lever and the hinge 97. This is the simplest way of correcting for triangular engagement of the test part. If the triangular engagement of the test part by the gaging rolls 100 is not 120° then a different ratio should be used which can be calculated from the angle. Because of the ratio discussed or the point of contact of the connecting rod 107 with the connecting lever 96, all of the gaging means carried between the pair of adjacent pedestals 23a and 23b must be a triangular type of gaging means as distinguished from a gaging means engaging the test part across a diameter.

Pedestals 22a and 23a carry a pair of gaging means on one side thereof. One gaging means includes a gaging element or segment 105 on pedestal 22a and the cooperating gaging roll 87 carried by pedestal 23a, each mounted on its respective stud 34. The second gaging means shown includes a gaging element or segment 106 on the first pedestal 22a and the cooperating gaging roll 87 oppositely therefrom on pedestal 23a each mounted on its stud 34. A stop pin limits the pivotal movement to gaging position. This construction of the gage illustrates another feature of the gage herein. In other words, two adjacent pedestals may mount a plurality of gaging means on one side of the pedestals, that is the construction is not limited to a single gaging means on one face or side of the pedestals.

In addition each gaging means of a gaging roll and segment are opposite each other so that the test piece is engaged on a diameter thereof with the result that the connecting means must have a 1 to 1 transmission ratio of the movement or position of the pedestal 23a to the connecting lever 96 and hence to the indicator. It is for this reason that the connecting rod or pin 110 which is secured to the pedestal 23a passes through a hole 111 in the pedestal 23b and is shown engaging pedestal 24a or particularly abutting the end of its connecting rod 98. Since pedestal 24a has a 1 to 1 motion transmission connection with the lever 96 and the indicator, a movement or position of pedestal 23a may be transmitted to move the pedestal 24a whereupon its movement is transmitted through its own connecting means or rod to the lever in a 1 to 1 ratio with the indicator contactor.

It is clear that the gaging means having triangular engagement of the test piece could just as well be mounted on pedestals 23b and 24a or 22a and 23a. If such had been the case, the connecting means or rod carried by the pedestal 24a would be carried in the same hole as that through which the connecting rod 107 passes to give the .866 motion transmitting ratio to the indicator or connecting lever. Should pedestals 23b and 24a have angularly engaging gaging means, then with gaging means between pedestals 23a and 23b engaging across a diameter of the test part T, then the connecting rod for the pedestal 23b would be mounted in a hole in this pedestal such as 111 or 113 and pass through a corresponding hole in pedestal 24a to engage the indicator lever at a point giving a 1 to 1 transmission ratio. In the alternative, with the gaging means carried by pedestals 23b and 24a engaging across a diameter, the connecting rod may engage pedestal 24a or its connecting rod for a 1 to 1 ratio reading. If the gaging means between pedestal 22a and 23a is again the type of gaging means which engages the test part across a diameter then the connecting rod carried by pedestal 23a may engage pedestal 23b whereupon its movement and the movement of pedestal 23b is transmitted to its connecting means or rod 98 and to the connecting lever in a 1 to 1 ratio.

In order to give the maximum adaptation to various gaging situations that may be involved, the pedestals may have a plurality of holes therethrough as illustrated in FIG. 6 in which additional holes 112, 113, 114 and 115 are provided. These holes are threaded at one end such as the end towards the last pedestal for receiving its own connecting rod if used. These threads are larger than the hole so that the connecting rods of other pedestals may pass therethrough thereby by-passing a particular pedestal in the manner illustrated by rods 107 and 110. In other words in the gage illustrated in FIG. 5, the connecting rod in passing through the pedestal 24 by-passes this pedestal in transmitting its motion or position to the operating lever 96 and hence the indicator. It is understood that gaging means may be mounted on the opposite sides of one or more of adjacent pairs of pedestals. In order to accommodate all of the holes for connecting rods as illustrated, the operating lever should have a width at least that of the plurality of these holes.

The operating lever 96 is adjacent to the indicator mounting means 66 so that an operating connection is provided between each intermediate pedestal and the last pedestal to the lever 96 and hence to an indicator carried by the indicator mounting means. This operating connection may include another pedestal or its operating rod as shown by the connection of rod 110 with the last pedestal or particularly its operating rod 98. This indicator mounting means may be carried by the base and engage the operating lever 96 as shown or may be carried by the lever 96 and engage the base. In either case a reading is secured on the indicator and all that is necessary is that the indicator mounting means be carried by the gage such that the indicator mounted therein is connected to be responsive to the movement of all of the pedestals. If all of the gaging means of the gage of FIG. 5 are of the same type, that is all engaging the test piece T across a diameter or all engage the test piece triangularly, then the operating connection for each pedestal may engage the next adjacent pedestal and the last pedestal transmits it to the single indicator. Again the operating connection between pedestal 23a may be directly with the operating lever by using an operating rod passing through pedestal 24a in the hole 113 and directly engaging the operating lever 96. It is clear too that each pedestal may have its own indicator responsive to its movement in which event the plurality of indicator mounting means comprises indicator mounting mechanism. The more economical construction is one which uses a single indicator and hence a single indicator mounting means for all movable pedestals.

FIGS. 7 through 11 illustrate the gage of FIG. 5, mounted with a gaging unit or means primarily for analyzing lead errors of the thread of a test part T as well as for determining other thread faults such as taper in the thread, overall assemble-ability and others. Similar parts are similarly numbered. This gaging unit could be mounted on pedestals 23a and 23b, however, for reasons which will appear, the unit is shown mounted on pedestals 22a and 23a to further illustrate the wide utility provided by the gage. This gaging unit uses the basic form of analyzer roll described in Patent 2,842,862 dated July 15, 1958, but with additional structure for additional testing to be described hereinafter.

The gage shows a roll frame 120 which is pivotally mounted on the first pedestal 22a on a pivot 121. This roll frame mounts a pair of spaced gaging roll means 122 and 123 each rotatably mounted on a stud means 34. A stop 124 may be used to limit the pivotal movement of the roll frame, although this is not necessary. An analyzer gaging roll 126 (FIGS. 8 and 11), is mounted on stud means 127 carried by the second pedestal 23a. The stud means for the analyzer gaging roll includes a stud 128 having a key 129 engaging in a key slot 130 in the bore of the roll. The stud 128 projects through a stud hole 132 in the pedestal and carries a knob 131 for turning the analyzer roll. This analyzer gaging roll is freely slidable axially on the stud 128.

The analyzer roll 126 (FIG. 11), is divided into a plurality of peripheral segments or sectors, eight being particularly shown. For a thread having a length of one inch or more, and the analyzer roll being one inch long, the number of sectors may correspond with the number of threads per inch on the test part so that the lead error per inch will be indicated. An analyzer roll of half this length would have half the number of thread ridges and the lead error of the last ridge is multiplied by two for lead error per inch, if desired. One segment carries a plurality of gaging ridges 134 on its periphery which are in axial alignment to engage the test thread T over the length of the roll. One gaging ridge is not provided, although it could well be. The second sector or segment carries a single gaging ridge 135 spaced from the first or right hand gaging ridge 134 (FIG. 11), such as by one thread. The third peripheral segment has a single gaging ridge 136 which is equally spaced axially as the gaging ridge 135 is spaced from the gaging ridge 134. The 4th, 5th, 6th, 7th and 8th segments or sectors also carry a single gaging ridge 137, 138, 139, 140 and 141 respectively equally spaced axially in the same manner. In other words each gaging ridge is equally spaced from the gaging ridges of adjacent segments or sectors and are spaced peripherally in succession. This spacing between adjacent single gaging ridges may correspond with one, two, three, etc., threads of the test part as desired but whatever spacing is used it is the same for each ridge.

The analyzer roll 126 is slidable axially on its stud means 127 and any axial movement or the axial position of the roll is indicated on an indicator in any suitable fashion. In the construction shown there is a slide pin 143 slidably mounted in a hole 132 through the pedestal, one end of which engages the end of the analyzer roll and the other end engages an arm 144 which is pivotally mounted on the pedestal on a pivot 145 carried by a bracket 146. This bracket is secured to the pedestal by a screw 147. The arm 144 is part of a bell crank lever having an arm 148 extending at right angles to the arm 144 which arm 148 is engaged by the contactor C of an indicator 149 mounted on the bracket 146. This bell crank provides a one to one ratio from the pivot 145 for the point of contact of the pin 143 and the point of contact of the contactor C, so that any axial movement or the axial position of the analyzer roll 126 is transmitted to the indicator 149 for direct reading. Incidentally, it is desirable that the dial of the indicator 149 be in a position to read the dial from a position as viewed in FIG. 8.

The gaging roll means 122 or reference roll means, (FIG. 9), comprises two rolls one of which is an axially fixed roll 152, in that it is rotatable or turnable on its stud means 34 but has no axial movement. It carries a gaging ridge means, preferably, a pair of spaced gaging ridges 153 although it may be a single gaging ridge. The gaging ridge means on this gaging roll constitutes the reference point in testing a thread for lead error and taper. The roll means 122 also includes an axially movable roll 154 suitably mounted for rotation and axial freedom of movement. In the construction particularly illustrated, the roll is rotatably mounted on the axially fixed roll 152 with clearance between its ends so that it has an amount of axial movement corresponding with at least the maximum lead error which can occur in the screw thread T. In other words it can adjust its axial position to both maximum long and short lead in the test thread. This roll is shown with a gaging ridge means formed by a single gaging ridge 155.

The gaging roll means or floating roll means (FIG. 10), comprises a pair of gaging rolls mounted on a stud means 34 each mounted for rotation and for axial movement. One gaging roll 157 has a gaging ridge means of a pair of ridges 158 spaced apart by one thread, although the ridge means could well be a single ridge. The other gaging roll 159 has gaging ridge means comprising a pair of spaced gaging ridges 160 which also may be a single gaging ridge.

This invention is presented to fill a need for improvements in dimensional gage with tandem pedestals. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A dimensional gage adapted to use an indicator having a contactor comprising a base having parallel side walls, pedestal means including a first pedestal and at least one intermediate pedestal and a last pedestal, pedestal mounting means carried by the base and the pedestals to mount the latter on the base in tandem relation, said pedestal mounting means mounting said intermediate and the last pedestal for longitudinal gaging movement towards and away from the first pedestal and each other whereby all pedestals other than the first have gaging movement, pedestal stop means for each intermediate pedestal carried by one of either said intermediate pedestal or base and engaging the other to limit the movement of said intermediate pedestal towards the first pedestal and permit freedom of movement in the opposite direction towards the last pedestal, gaging mechanism including a plurality of gaging means carried by the pedestals, each gaging means including at least one first gaging element carried by the first and each intermediate pedestal and a cooperating gaging element for each first gaging element carried by each intermediate and the last pedestal, and indicator mounting means carried by the gage and located such that the movement of the movable pedestals is indicated on indicator means to be carried by said indicator mounting means.

2. A dimensional gage as in claim 1 in which the indicator mounting means is a single indicator mounting means, and including an operating connection between at least each said intermediate pedestal and a point adjacent to the indicator mounting means such that an indicator to be carried by said single indicator mounting means will be operated.

3. A dimensional gage as in claim 2 in which the operating connection includes a connection between each said intermediate pedestal and its next adjacent movable pedestal.

4. A dimensional gage as in claim 3 in which said pedestals have a plurality of sides with said gaging means being on one side, said gaging mechanism including a second gaging means on another side of at least one pair of adjacent pedestals with a gaging element mounted on one pedestal and a cooperating gaging element mounted on the next adjacent pedestal, and said gaging means on both sides of the pedestals being of the same type.

5. A dimensional gage as in claim 2 in which the operating connection includes an operating lever, a first operating means, a second operating means hinge means mounting the operating lever on the base adjacent to the indicator mounting means, one of said gaging means including a gaging element with spaced gaging rolls to engage the test part at points angularly disposed, another of said gaging means being diametrical gaging means, said first operating means being between the movable pedestal of said one gaging means and the operating lever, and engaging the operating lever spaced from the hinge a greater distance than the distance of the indicator mounting means therefrom, said second operating means being for the pedestals having diametrical gaging means and engaging the operating lever at the same distance from the hinge as the distance of the indicator mounting means therefrom.

6. A dimensional gage as in claim 5 in which each intermediate pedestal and the last pedestal have a plurality of horizontally spaced holes therethrough, and at least one operating means including a connecting rod secured in one hole in one pedestal and passing through a corresponding hole in at least the next adjacent intermediate pedestal.

7. A gage as in claim 6 including adjusting means to adjustably mount the first pedestal on the base, adjusting means to adjust the pedestal stop means for each said intermediate pedestal, and the operating means being adjustable on their respective pedestals.

8. A dimensional gage as in claim 1 in which said pedestals have a plurality of sides, said gaging means being on one side the gaging mechanism includes a gaging second means carried on another side of at least one pair of adjacent pedestals and said gaging means on both sides of the pedestal being of the same type.

9. A dimensional gage as in claim 1 in which the base is longer than the pedestals in tandem, said pedestal mounting means including side walls on the base and each pedestal, and guide means in the side walls of the base and each pedestal, said guide means including a single guideway on each side wall of the base for all of the pedestals and mounting the first pedestal on the guide means of the base and mounting each of the other pedestals for gaging movement with respect to its adjacent pedestal.

10. A dimensional gage as in claim 9 in which the base includes a base member substantially longer than the pedestals in tandem with the guide means extending the full length thereof and an end member secured at each end of the base member, and adjusting means carried by the end member to adjust the position of the first pedestal on the base member.

11. A dimensional gage as in claim 9 in which adjustment means is carried by one of either said base and the first pedestal and engaging said other to adjust the position of the first pedestal on the base, the pedestal stop means being adjustable to adjust the stop position of each intermediate pedestal towards the first pedestal, and including an adjustable, operating connection for each said intermediate pedestal to a point adjacent to the indicator mounting means.

12. A dimensional gage as in claim 1 in which one gaging element includes a first roll means and a second roll means spaced therefrom, and the cooperating gaging element is a third roll means, one of said roll means being an analyzer roll having a plurality of peripherally spaced sectors, each sector less one having a gaging ridge to engage one thread of a test part, the gaging ridges being equally spaced apart axially and successively, another of said roll means being a reference roll means including a first roll and a second roll, said first and second rolls having gaging ridges spaced from each other, the remaining roll means being a floating roll means including a first roll and a second roll each having spaced gaging ridges, mounting means mounting each roll means for rotation, the mounting means for the analyzer roll mounting the latter for axial movement, the mounting means for the reference roll means mounting its first roll without axial movement and mounting its second roll for axial movement, the mounting means for the floating roll means mounting its first and second rolls for axial movement, and indicator mounting means carried adjacent to the analyzer roll and adapted to receive an indicator to be responsive to axial movement of the analyzer roll.

13. A dimensional gage as in claim 12 in which the remaining sector of the analyzer roll has a plurality of spaced gaging ridges in axial alignment.

14. A dimensional gage adapted to use an indicator having a contactor comprising a base having parallel side walls, pedestal means including a first pedestal and at least a second pedestal, parallel side walls on at least said second pedestal, pedestal mounting means carried by the base and at least the second pedestal to mount the pedestals on the base in tandem relation, said pedestal mounting means mounting said second pedestal for longitudinal gaging movement including guide means carried by the side walls of the base and the side walls of at least said second pedestal, pedestal stop means carried by one of the parts including said second pedestal and the base and engaging the other part to limit the movement of said pedestal towards the first pedestal and permit freedom of movement in the opposite direction, at least one gaging means carried by the pedestals, the gaging means including at least one gaging element carried by the first pedestal and a cooperating gaging element carried by the second pedestal, one gaging element including a pair of spaced roll means and the cooperating gaging element is a roll means, one of said roll means being an analyzer roll having a plurality of peripherally spaced sectors, each sector less one having a gaging ridge to engage one thread of a test part, the gaging ridges being equally spaced apart axially from its adjacent ridge or ridges and successively, another of said roll means being a reference roll means including a pair of spaced rolls, the remaining roll means being a floating roll means including a pair of spaced rolls, mounting means mounting each roll means for rotation, the mounting means for the analyzer roll mounting the latter for axial movement, the mounting means for the reference roll means mounting one roll without axial movement and mounting the other roll for free axial movement, the mounting means for the floating roll means mounting both rolls for free axial movement, indicator mounting means carried adjacent to the analyzer roll and adapted to receive an indicator to be responsive to axial movement of the analyzer roll, and indicator mounting means carried by the gage and located such that the movement of the second pedestal would be indicated on an indicator carried thereby.

15. A dimensional gage as in claim 14 in which the remaining sector of the analyzer roll has a plurality of spaced gaging ridges in axial alignment.

References Cited by the Examiner

UNITED STATES PATENTS

| 2,586,053 | 2/1952 | Johnson | 33—199 |
| 2,842,862 | 7/1958 | Johnson | 33—199 |

FOREIGN PATENTS

| 552,634 | 4/1943 | Great Britain. |

LEONARD FORMAN, *Primary Examiner.*

J. M. FREED, *Assistant Examiner.*